No. 655,307. Patented Aug. 7, 1900.
P. A. REID.
WIRE FENCE.
(Application filed Apr. 5, 1898.)
(No Model.)

Witnesses
Edw. D. Duvall
Chas. E. Riordon

Inventor
Pettis A. Reid
By Julian C. Dowell
His Attorney

UNITED STATES PATENT OFFICE.

PETTIS A. REID, OF RICHMOND, INDIANA.

WIRE FENCE.

SPECIFICATION forming part of Letters Patent No. 655,307, dated August 7, 1900.

Application filed April 5, 1898. Serial No. 676,512. (No model.)

*To all whom it may concern:*

Be it known that I, PETTIS A. REID, a citizen of the United States, residing at Richmond, in the county of Wayne and State of Indiana, have invented certain new and useful Improvements in Wire Fences; and I do hereby declare the following to be a full, clear, and exact description of the invention, such as will enable others skilled in the art to which it appertains to make and use the same.

This invention relates to fences of that type in which wooden slats are arranged vertically at suitable distances apart and wires are stretched between the slats, the wires being associated together in pairs and twisted into strands adapted to be stretched between the slats and each pair of wires being formed to embrace the slats. This type of fence has found much favor with farmers and others having need of a cheap and easily-erected fence for inclosing large tracts of land; but heretofore certain defects have existed which have detracted more or less from the efficiency of this style of fence and prevented its more extended adoption. The present invention has in view the removal of such defects and the provision of a fence of this type which will be entirely satisfactory in every way; and to this end the invention provides a construction of slats for a fence of this kind which will provide against any slipping of the wires thereof up or down, while at the same time preventing any lateral movement of the slats themselves, so that the proper relation between the slats and the wires of the fence will be at all times preserved.

The drawings which accompany and form part of this specification illustrate embodiments of the invention, and of said drawings—

Figure 1:
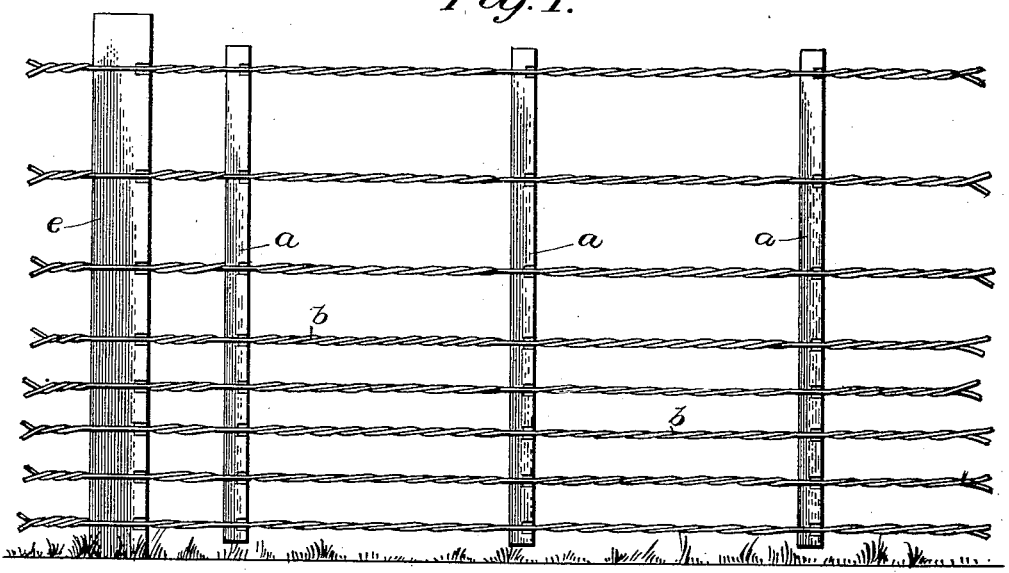
Figure 2:
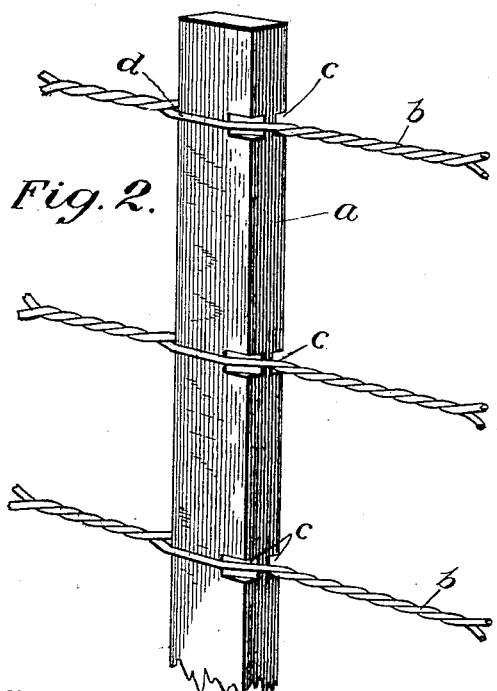
Figure 3:
Figure 4:
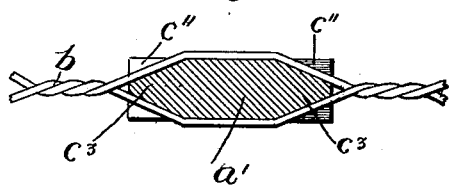

Figure 1 represents a portion of the fence in side elevation constructed in accordance with my invention. Fig. 2 represents a portion of a slat with wires applied thereto, this view being on a somewhat larger scale than Fig. 1. Figs. 3 and 4 are cross-sectional views illustrating different constructions of slats which may be resorted to in carrying out the invention.

In the drawings the reference-letter $a$ designates the slats, and $b$ the wires, and by reference to Figs. 2 and 3 it will be observed that each slat is formed in opposite sides at one edge with notches $c$, which occur in pairs at suitable distances apart, the said notches being made diagonally across the corners, so that the bottoms are tapered or scarfed and converge, producing a triangular cross-sectional formation of the slat, as illustrated at $c'$ in Fig. 3. The wires $c$ of each pair are twisted together, as shown, where they extend between two slats and are spread apart, so as to embrace the slat, as shown at $d$, the loop or opening thus formed having a substantially-rectangular shape at the middle, embracing the body of the slat, and having a triangular formation at each end. This triangular formation corresponds with the formation of the slat where it is notched in the manner above described, and the wires lie in the notches; but the latter are made considerably wider than the thickness of the wires, so as to allow ample space, for a purpose hereinafter explained.

In Fig. 4 a slat $a'$ is shown in cross-section, which is provided with notches $c''$ at each end, so that there is a triangular cross-sectional formation $c^3$ of the slat on each side of the central portion thereof, and the looped portions of the wires engage a greater portion of the surface of the slat than in the form of slat shown in Fig. 3.

The posts, such as that designated by the reference-letter $e$ in Fig. 1 and which support the fence at suitable intervals, may have similar formations to the slats as to the notching thereof for the accommodation of the wires, and it will be seen that with such a construction of slats and posts the wires of the fence will be effectually prevented from moving up or down to any appreciable extent. As before stated, the notches are made sufficiently wide to allow some play, and this is to adapt the fence to hilly ground, where the wires may have to extend obliquely while the posts and slats stand vertically.

It will be seen that the construction of the fence prevents openings being formed therein which would permit stock passing through the same, and, moreover, the fence is not likely to collapse by reason of age, which occurs with many of the fences of this type heretofore in use. It will further be observed that the object is accomplished by removing the minimum amount of wood from the slats, so that the same are not appreciably weakened, and, moreover, the scarfed form of notches considerably reduces the liability of the wires becoming embedded in the wood of the slats when the latter become partially decayed or softened with age. This latter effect is more completely accomplished by the construction shown in Fig. 4, where there are no right-angle corners for the wires to pass over, and hence less opportunity for the wires to become embedded in the wood than with the construction shown in the other figures. Aside from the advantages above stated, resulting from the widening of the notches where the wires lie in the same, this also provides for drainage and for circulation of air, so that the wood will not so soon decay or become soft, and hence the life of the fence is much prolonged by the feature above mentioned.

It will be observed that notwithstanding the many advantages resulting from the invention herein disclosed the expense of constructing and erecting a fence of this type is not increased to an appreciable extent, for the change in construction is not a radical one although productive of great improvement.

Having thus fully described my invention, what I claim as new, and desire to secure by Letters Patent of the United States, is—

In a fence, the combination of a series of vertically-disposed posts or slats which are substantially rectangular in cross-section and provided with beveled recesses at intervals along the edges thereof to receive and confine a corresponding series of horizontally-arranged wires, said recesses extending diagonally across the corners of the slats and having flat bottoms, together with a series of wires twisted together in pairs so as to form loops at intervals along the length thereof, said loops embracing said posts or slats and occupying said recesses with their end portions lying along the flat bottoms of the recesses; said recessed portions of the posts or slats practically filling said loops, substantially as shown and described.

In testimony whereof I affix my signature in presence of two witnesses.

PETTIS A. REID.

Witnesses:
BENJAMIN F. HARRIS,
EMMA REID.